United States Patent [19]
McMullen et al.

[11] Patent Number: 5,514,924
[45] Date of Patent: May 7, 1996

[54] MAGNETIC BEARING PROVIDING RADIAL AND AXIAL LOAD SUPPORT FOR A SHAFT

[75] Inventors: Patrick T. McMullen, Simi Valley; Co S. Huynh, Glendale, both of Calif.

[73] Assignee: AVCON—Advanced Control Technology, Inc., Agoura Hills, Calif.

[21] Appl. No.: 136,534

[22] Filed: Oct. 14, 1993

Related U.S. Application Data

[63] Continuation-in-part of Ser. No. 106,927, Aug. 16, 1993, Pat. No. 5,315,197, which is a continuation-in-part of Ser. No. 876,586, Apr. 30, 1992, Pat. No. 5,250,865.

[51] Int. Cl.⁶ .................................................. H02K 7/09
[52] U.S. Cl. ................................................. 310/90.5
[58] Field of Search ...................... 310/90.5, 90

[56] References Cited

U.S. PATENT DOCUMENTS

| | | | |
|---|---|---|---|
| 3,890,019 | 6/1975 | Boden et al. | 310/90.5 |
| 3,976,339 | 8/1976 | Sabnis | 310/90.5 |
| 4,037,886 | 7/1977 | Boden et al. | 310/90.5 |
| 4,072,370 | 2/1978 | Wasson | 310/90.5 |
| 4,077,678 | 3/1978 | Studer et al. | 310/90.5 |
| 4,080,012 | 3/1978 | Boden et al. | 310/90.5 |
| 4,128,280 | 12/1978 | Purtschert | 310/90.5 |
| 4,180,296 | 12/1979 | Habermann | 310/90.5 |
| 4,405,286 | 9/1983 | Studer | 310/90.5 |
| 4,483,570 | 11/1984 | Inoue | 310/90.5 |
| 4,563,046 | 1/1986 | Shimamoto | 310/90.5 |
| 4,583,031 | 4/1986 | Brunet et al. | 310/90.5 |
| 4,583,794 | 4/1986 | Takahara et al. | 310/90.5 |
| 4,597,613 | 7/1986 | Sudo | 310/90.5 |
| 4,620,752 | 11/1986 | Fremerey et al. | 310/90.5 |
| 4,626,764 | 12/1986 | Habermann et al. | 310/90.5 |
| 4,634,191 | 1/1987 | Studer | 310/90.5 |
| 4,652,780 | 3/1987 | Murakami et al. | 310/90.5 |
| 4,806,835 | 2/1989 | Habermann | 318/460 |
| 4,811,906 | 3/1989 | Prus | 384/446 |
| 4,812,694 | 3/1989 | Fremery | 310/90.5 |
| 4,812,757 | 3/1989 | Meins et al. | 324/207 |
| 4,839,550 | 6/1989 | Mizuno et al. | 310/90.5 |
| 4,841,184 | 6/1989 | Chen et al. | 310/90.5 |
| 4,866,318 | 9/1989 | Habermann et al. | 310/90.5 |
| 4,866,380 | 8/1989 | Meins et al. | 324/207 |
| 4,872,357 | 10/1989 | Vaillant De Guelis et al. | 74/5.1 |
| 4,879,500 | 11/1989 | Kanemitsu | 310/90.5 |
| 4,885,491 | 12/1989 | Hiyama et al. | 310/90.5 |
| 4,889,039 | 12/1989 | Miller | 310/90.5 |
| 4,891,832 | 1/1990 | Ebersberger | 378/132 |
| 4,895,023 | 1/1990 | Roubinet et al. | 310/90.5 |

(List continued on next page.)

FOREIGN PATENT DOCUMENTS

| | | | |
|---|---|---|---|
| 2841256 | 4/1980 | Germany . | |
| 56-59027 | 5/1981 | Japan | 310/90.5 |
| 57-103926 | 6/1982 | Japan | 310/90.5 |
| 58-84220 | 5/1983 | Japan | 310/90.5 |
| 59-43220 | 3/1984 | Japan . | |
| 61-116121 | 6/1986 | Japan | 310/90.5 |
| 3-284139 | 12/1991 | Japan | 310/90.5 |
| 725155 | 3/1980 | U.S.S.R. | 310/90.5 |

Primary Examiner—Clayton E. LaBalle
Attorney, Agent, or Firm—Kelly, Bauersfeld & Lowry

[57] ABSTRACT

A magnetic bearing utilizes electromagnets together with a permanent magnet to provide controlled radial and axial (thrust) load support of a shaft including a thrust disc, relative to a housing. In one form, the magnetic bearing includes an arcuate ring of high magnetic flux permeability, and a plurality of electromagnet coils circumferentially positioned about the arcuate ring which generate a radially polarized controllable electromagnetic field. A permanent magnet is spaced radially outwardly from the plurality of electromagnet coils and is linked magnetically to the shaft through both a radial air gap and an axial air gap between the housing and the shaft/thrust disc. A pair of electromagnet coils associated with the arcuate ring and circumscribing a portion of the shaft, generate an axially polarized electromagnetic field which links the shaft to the housing through the axial air gap. The magnetic bearing may include one or more arcuate rings which support electromagnetic coils for generating a radially polarized controllable electromagnetic field.

22 Claims, 3 Drawing Sheets

U.S. PATENT DOCUMENTS

| | | | |
|---|---|---|---|
| 4,900,962 | 2/1990 | Hockney et al. | 310/90.5 |
| 4,908,558 | 3/1990 | Lordo et al. | 310/90.5 |
| 4,910,449 | 3/1990 | Hiyama et al. | 310/90.5 |
| 4,912,387 | 3/1990 | Moulds, III | 310/90.5 |
| 4,918,345 | 4/1990 | Vaillant de Guelis et al. | 310/90.5 |
| 4,920,290 | 4/1990 | Murakami et al. | 310/90.5 |
| 4,928,561 | 5/1990 | Fouche | 310/90.5 |
| 4,929,158 | 5/1990 | Girault | 417/405 |
| 4,942,321 | 7/1990 | Kanemitsu | 310/90.5 |
| 4,946,345 | 8/1990 | Watanabe et al. | 415/90 |
| 4,947,067 | 8/1990 | Habermann et al. | 310/90.5 |
| 4,956,571 | 9/1990 | Gordon et al. | 310/90.5 |
| 4,964,147 | 10/1990 | Laurent et al. | 378/125 |
| 4,969,803 | 11/1990 | Turanskyj | 417/247 |
| 4,976,177 | 12/1990 | Fouche | 310/90.5 |
| 4,982,126 | 1/1991 | Jolivet et al. | 310/90.5 |
| 4,983,869 | 1/1991 | Vaidya et al. | 310/90.5 |
| 4,988,906 | 1/1991 | Littlefield | 310/90.5 |
| 5,005,297 | 4/1991 | Aehnelt et al. | 53/559 |
| 5,010,563 | 4/1991 | Laurent et al. | 310/90.5 |
| 5,012,359 | 4/1991 | Kohno et al. | 360/98.07 |
| 5,021,697 | 6/1991 | Kralick | 310/90.5 |
| 5,027,280 | 6/1991 | Ando et al. | 310/90.5 |
| 5,072,146 | 12/1991 | New | 310/90.5 |
| 5,250,865 | 10/1993 | Meeks | 310/90.5 |

MAGNETIC BEARING PROVIDING RADIAL AND AXIAL LOAD SUPPORT FOR A SHAFT

RELATED APPLICATION

This is a continuation-in-part of U.S. patent application Ser. No. 08/106,927, filed Aug. 16, 1993 now U.S. Pat. No. 5,315,197 and entitled THRUST MAGNETIC BEARING USING PASSIVE AND ACTIVE MAGNETS, which is a continuation-in-part of U.S. patent application Serial No. 07/876,586, filed Apr. 30, 1992, now U.S. Pat. No. 5,250,865 entitled ELECTROMAGNETIC THRUST BEARING FOR COUPLING A ROTATABLE MEMBER TO A STATIONARY MEMBER.

BACKGROUND OF THE INVENTION

This invention relates generally to improvements in magnetic bearings. More particularly, the present invention relates to a magnetic bearing which provides both radial and axial load support for a shaft.

Electromagnetic bearings are highly effective for supporting a body such as a rotating shaft, which is effectively floated or levitated by magnetic fields. In this way the rotating shaft has no frictional contact with any stationary structure, thereby permitting relatively friction free rotation of the shaft or rotation of a body about the shaft. This arrangement possesses the obvious advantage that there is no mechanical abrasion, which results in reduced mechanical noise and durability not available with other types of bearing structures. Moreover, because of the reduced frictional effects which would otherwise be encountered with conventional bearing structures, it is possible to obtain higher speeds of rotation with electromagnetic bearings.

Magnetic bearings typically require little maintenance and readily lend themselves to operation in hostile environments such as in connection with corrosive fluids where other conventional bearings would be destroyed or rendered inoperable. Further, magnetic bearings are suitable for supporting moving bodies in a vacuum, such as in outer space, or in canned pumps where the pump rotor must be supported without the use of physically contacting bearings.

Conventional electromagnets utilized for energizing levitation gaps are inefficient in that they require a substantial amount of electrical power to generate the required electromagnetic field. In general, prior electromagnetic bearings require large electromagnet coils and control circuitry which have been found to be inherently inefficient. There have been some proposals to use permanent magnets in combination with electromagnets in order to provide greater stabilization and control. However, the conventional prior designs which utilize both electromagnets and permanent magnets are typically inefficient from a spacial standpoint and are considerably complex.

One of the primary considerations in the development of magnetic bearings is to eliminate so-called air gaps. The so-called air gaps form a portion of the magnetic flux pathway of the electromagnets and permanent magnets, and provide a bridge between a supporting structure and a levitated structure. In actuality, some air gaps must be tolerated in order to position a suspended or rotatable body. Thus, air gaps to some extend cannot be avoided, but it is desirable to reduce air gaps to an absolute minimum.

From a pure physics standpoint, an air gap introduces great inefficiency into any type of magnetic structure. An air gap is about 2,000 times less efficient that an iron core medium for transmitting magnetic flux. Thus, in terms of inefficiency, a magnetic bearing structure which has an air gap of 0.1 inch is far more inefficient than a magnetic bearing which has an iron gap of 20 inches.

In some working environments it is desirable to provide radial and thrust load support to a shaft at or adjacent to one end of the shaft only, while permitting rotation of the shaft relative to a stationary housing. Such shaft support lends itself to gimballed mirror, gimballed sensor, or gimballed optics configurations. Further, it is desirable to minimize the number of controls required for complete shaft support and control. U.S. Pat. No. 5,216,308 entitled MAGNETIC BEARING STRUCTURE PROVIDING RADIAL, AXIAL AND MOMENT LOAD BEARING SUPPORT FOR A ROTATABLE SHAFT illustrates a state-of-the-art structure suitable for such working environments. This magnetic bearing structure, however, includes separate radial and axial/moment load bearings to provide the required support for the shaft.

Accordingly, there has a been a need for a novel magnetic bearing capable of providing radial and axial load support to a shaft while permitting rotation of the shaft relative to a stationary housing, which combines the functions of separate radial and axial bearings into a single magnetic bearing structure. Such a novel magnetic bearing should be significantly smaller, lighter and less complex than other similar magnetic bearing systems which utilize separate radial and axial bearings. Additionally, there exists a need for such a magnetic bearing wherein magnetic efficiency of the device is optimized by minimizing air gaps between the levitated and support structures, and which utilizes a permanent magnet bias to reduce power consumption to controlling electromagnet coils. Moreover, there has been a continuing need for such a magnetic bearing which utilizes a combination of radially polarized and axially polarized magnetic fields to produce a compact and spacially efficient structure which obtains a high power efficiency. The present invention fulfills these needs and provides other related advantages.

SUMMARY OF THE INVENTION

The present invention resides in an improved magnetic bearing for supporting a rotatable member including a thrust disc in a suspended or levitated position with respect to a stationary member. The magnetic bearing comprises, generally, first and second means associated with the stationary member for generating a radially polarized magnetic field, and means associated with the stationary member for generating an axially polarized magnetic field. The first radially polarized magnetic field generating means is linked magnetically to the rotatable member through a first air gap between the rotatable member and the stationary member to provide radial magnetic flux coupling of the rotatable member to the stationary member. The second radially polarized magnetic field generating means is linked magnetically to the rotatable member through the first air gap and a second air gap between the thrust disc and the stationary member, to provide both radial and axial magnetic flux coupling of the rotatable member to the stationary member. The axially polarized magnetic field generating means is linked magnetically to the rotatable member through the second air gap to provide axial magnetic flux coupling of the rotatable member to the stationary member.

The magnetic bearing of the present invention provides controlled radial and thrust (axial) load support of the rotatable member relative to the stationary member. The arrangement of the magnetic bearing of the present invention uniquely utilizes electromagnets and permanent magnets to provide three degree-of-freedom control of a rotatable shaft without any other bearing support system. Thus, a compact and spacially efficient system is produced which is lightweight and which has a high degree of power efficiency.

In its most basic form, the magnetic bearing of the present invention generates a high density magnetic flux directed through a minimum number of air gaps between the rotatable member and the stationary member. This provides a generally uniform magnetic field surrounding a portion of the rotatable member which, under perfect conditions, could theoretically suspend or levitate the rotatable member with respect to the stationary member. Such perfect conditions rarely exist, and certainly do not persist in an operating environment, and thus any displacement of the rotatable member relative to the stationary member will cause the rotatable member to be drawn into contact with a portion of the stationary member. This is known as the "negative spring" effect created by a constant magnetic field.

In order to counteract the "negative spring" effect, the present invention utilizes controllable, variable flux electromagnetic fields to stabilize the rotatable member in an optimal centered position relative to the stationary member. Variations in the positioning of the rotatable member are neutralized by an active electromagnet servo control system which produces a "positive spring" effect, that is, a high stiffness restoring force. Sensors are positioned to detect displacement of the rotatable member relative to the stationary member. The servo control circuit can correct for any displacement of the levitated member by controlling the electromagnetic field forces. In this way, signals from the position sensors enable the servo control system to stabilize the rotatable member and maintain it in an optimal centered position.

In one preferred form of the invention, a three axis servo control system is utilized to levitate and provide support for the rotatable member. This three axis servo control system requires two position sensors to determine radial displacement of the rotatable member, and one position sensor to determine axial displacement thereof. The system is fully capable of controlling the electromagnetic bearing to compensate for radial and thrust loads applied to the rotatable member, to maintain it in an optimal centered position relative to the stationary member.

The first radially polarized magnetic field generating means includes an arcuate ring of high magnetic flux permeability, and a plurality of controllable electromagnet coils which are circumferentially positioned about the arcuate ring and radially spaced from the rotatable member. A permanent magnet, comprising the second radially polarized magnetic field generating means, circumscribes the rotatable member and is spaced radially outwardly from the electromagnet coils. The axially polarized magnetic field generating means includes a pair of electromagnet coils which are associated with the arcuate ring and situated on opposite sides thereof. These electromagnet coils circumscribe a portion of the rotatable member and are spaced radially outwardly from the electromagnet coils of the first radially polarized magnetic field generating means.

An axial stator pole is associated with the arcuate ring and is situated radially outwardly of the permanent magnet. The axial stator pole has two faces situated in opposite facing relation to two inward-facing thrust disc faces, to define a pair of second air gaps.

The rotatable member includes a pair of thrust discs which are axially spaced from one another. The arcuate ring, the electromagnet coils, the axial stator pole and the permanent magnet of the first and second radially polarized magnetic field generating means, and the electromagnet coils of the axially polarized magnetic field generating means, are all situated between the pair of thrust discs.

Magnetic flux generated by the radially polarized permanent magnet is redirected axially by the axial stator pole toward both thrust discs, across the second air gaps to the thrust discs wherein the magnetic flux is directed radially toward the rotatable member or shaft. The magnetic flux of the permanent magnet is then redirected axially toward the arcuate ring and then redirected radially across the first air gap between the shaft and the arcuate ring toward the permanent magnet.

The electromagnet coils of the axially polarized magnetic field generating means generate magnetic flux which is directed axially through the axial stator pole across one of the second air gaps to one of the thrust discs where the flux is redirected radially toward the rotatable member or shaft. The magnetic flux is then redirected axially through the shaft to the second thrust disc where it is redirected radially outwardly and then again axially across the other of the second air gaps back to the axial stator pole.

The electromagnet coils circumferentially positioned about the arcuate ring forming the first radially polarized magnetic field generating means, generate magnetic flux which is directed radially from the arcuate ring across the first air gap and through the shaft to an opposite side thereof. This magnetic flux is directed toward another stator pole in the stationary member having an opposite polarity as that of the first, and then is redirected circumferentially around the shaft through the arcuate ring.

A second preferred form of the invention is quite similar to the first preferred form described above, with the exception that only one thrust disc is utilized in connection with a modified axial stator pole. In this embodiment, the first air gap is defined by a radially outwardly facing surface of the thrust disc. The axial stator pole extends around the electromagnet coils to provide the two faces situated in opposite facing relation to opposite axially-facing thrust disc faces, to define the pair of second air gaps.

A third preferred form of the invention utilizes two arcuate rings which each support a plurality of electromagnet coils, disposed on opposite sides of a single thrust disc. In this embodiment, a single electromagnet coil is associated with both of the arcuate rings, which circumscribes a portion of the rotatable member and provides the axially polarized magnetic field generating means.

In all three preferred embodiments, radially polarized permanent magnets are utilized to generate a high density constant magnetic flux across both the first and second air gaps. The electromagnet coils circumferentially positioned about the arcuate ring and comprising the first radially polarized magnetic field generating means, are energized to add to or subtract from the magnetic flux across the first air gaps generated by the permanent magnets. Similarly, the electromagnet coils of the axially polarized magnetic field generating means are energized to control the axial positioning of the rotatable member relative to the stationary member by regulating the magnetic flux across the second air gaps.

The electromagnet coils are controlled through the servo control system in order to provide the desired amount of electromagnetic flux and to thereby control the electromagnetic fields around the rotatable member.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

The magnetic flux 40 generated by the permanent magnet 22 is directed radially through only a single radial air gap 18 to provide radial magnetic flux coupling of the shaft 14 to the housing 12. Similarly, the magnetic flux 40 is directed axially through a pair of axial air gaps 20 to provide axial magnetic flux coupling of the thrust discs 16 to the housing.

Under perfect conditions, and assuming no moment loading upon the shaft 14, if the shaft were to be precisely centered within the housing 12 so that a uniform radial air gap 18 existed completely around the shaft, and so that uniform axial air gaps 20 existed between the stator pole 28 and the thrust discs 16, then, theoretically, the high density magnetic field produced by the permanent magnet 22 would create a radially and axially directed force system which was metastable. However, any eccentricity of the shaft 14 will cause it to be drawn to one side or the other within the housing 12. This is the so-called "negative spring" effect of the constant magnetic field provided by the permanent magnet 22.

Figures 3, 4:
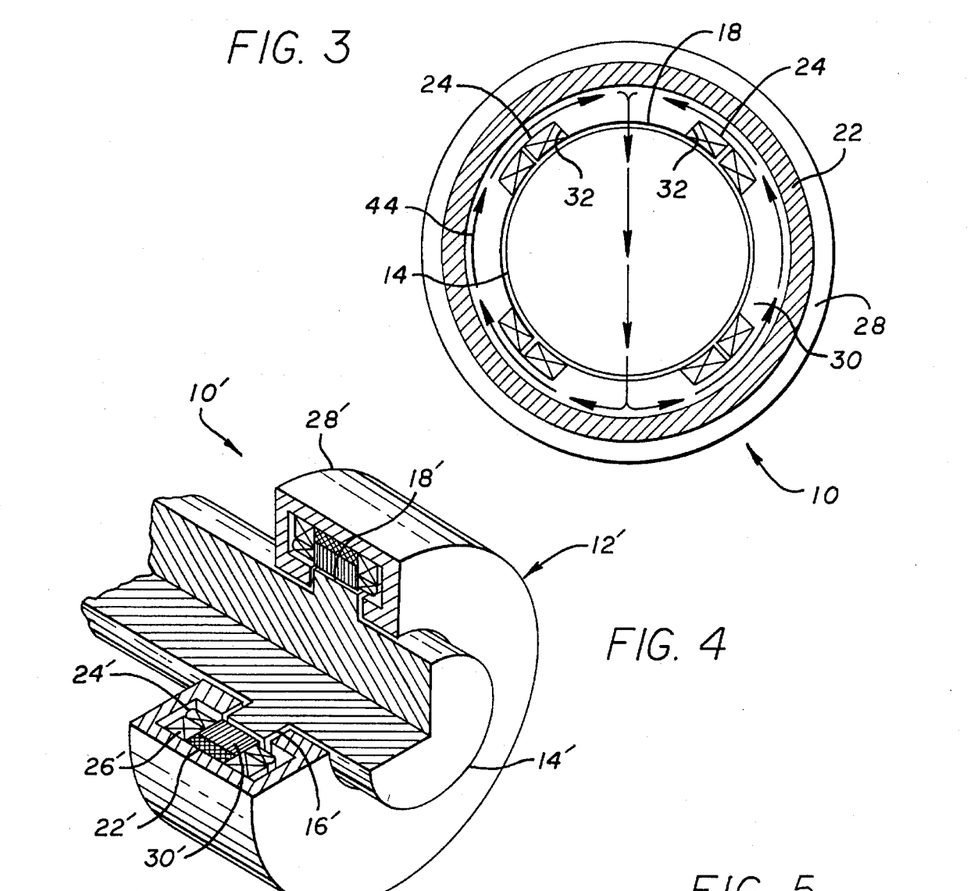
FIG. 3 is a reduced sectional elevational view taken generally along the line 3—3 of FIG. 2, illustrating an exemplary magnetic flux path generated by radially polarized controllable electromagnet coils.
FIG. 4 is a fragmented partially sectional perspective view similar to that shown in FIG. 1, illustrating a second magnetic bearing embodying the invention.

The active control electromagnet coils 24 and 26 positioned about the shaft 14 are controlled by a servo circuit to counteract the "negative spring" effect and produce a "positive spring," that is, a high stiffness restoring force that keeps the shaft 14 precisely centered radially between the arcuate ring 30 and axially relative to the opposite ends of the axial stator pole 28. In this regard, the reference number 44 identifies an exemplary magnetic flux path of the active control electromagnet coils 24 which generate a radially polarized controllable electromagnetic field surrounding a portion of the shaft 14 (FIG. 3). Each of the electromagnet coils 24 is capable of generating a radially polarized, controllable electromagnetic field, wherein the flux path 44 is directed across the radial air gap 18 and conducted through the shaft to a surfaces of the stator pole 28 and the thrust discs 16 define the axial air gaps 20.

An X-axis position sensor 34 and a Y-axis position sensor 36 are provided for sensing, respectively, X and Y-axis displacement of the shaft 14 relative to the housing 12. The purpose of the sensors 34 and 36 is to detect movement of the shaft 14 radially from its optimal centered position. When the position sensors 34 and 36 detect an eccentricity of the shaft 14, they generate electrical signals to a servo circuit which, upon receipt of such input signals, provides a restoring force by generating a signal to the active control electromagnet coils 24 in such a manner so as to reposition the shaft 14 in its optimal centered position. Similarly, a Z-axis position sensor 38 is provided for sensing Z-axis or axial displacement of the shaft 14 relative to the housing 12. When the position sensor 38 detects displacement of the shaft 12 along the Z-axis, it causes generation of electrical signals to the servo circuit which, upon receipt of such input signals, provides a restoring force by generating a signal to the active control electromagnet coils 26 in such a manner so as to reposition the shaft 14 in its optimal axial position.

Figure 2:
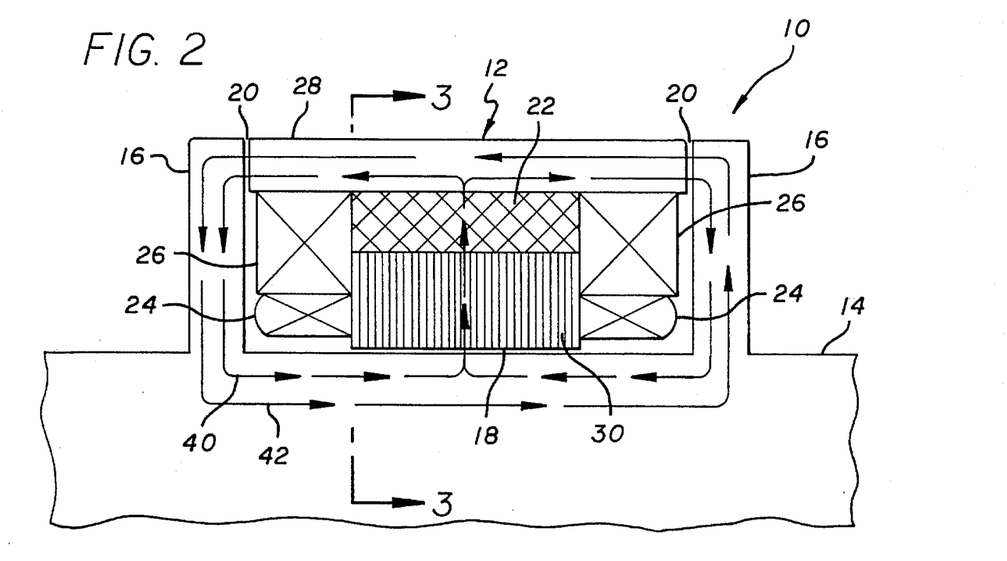
FIG. 2 is an enlarged fragmented sectional elevational view of the magnetic bearing illustrated in FIG. 1, showing exemplary magnetic flux paths generated by a radially polarized permanent magnet which circumscribes the shaft, and a pair of axially polarized electromagnet coils which also circumscribe the shaft.

With the foregoing basic construction of the magnetic bearing 10 set forth, its function will be described in greater detail. The radially polarized permanent magnet 22 generates a magnetic field having a magnetic flux path illustrated by the arrows having a reference number 40 (FIG. 2). The permanent magnet 22 generates a relatively constant, high density magnetic flux which is conducted through the stator pole 28 axially toward each of the thrust discs 16. The flux path 40 spans the axial air gaps 20, is directed radially inwardly toward the shaft 14 by the thrust discs 16, and then is redirected axially through the shaft and then radially across the radial air gap 18 24 and 26, together with the permanent magnet(s) 22, cooperatively provide controlled radial and axial (thrust) load support of the shaft 14 to suspend or levitate the shaft within the housing 12.

The magnetic bearing 10 of the present invention is controlled by a three-axis servo control system which utilizes two position sensors to detect radial displacement of the shaft 14, and one additional sensor to detect axial displacement.

Figure 1:
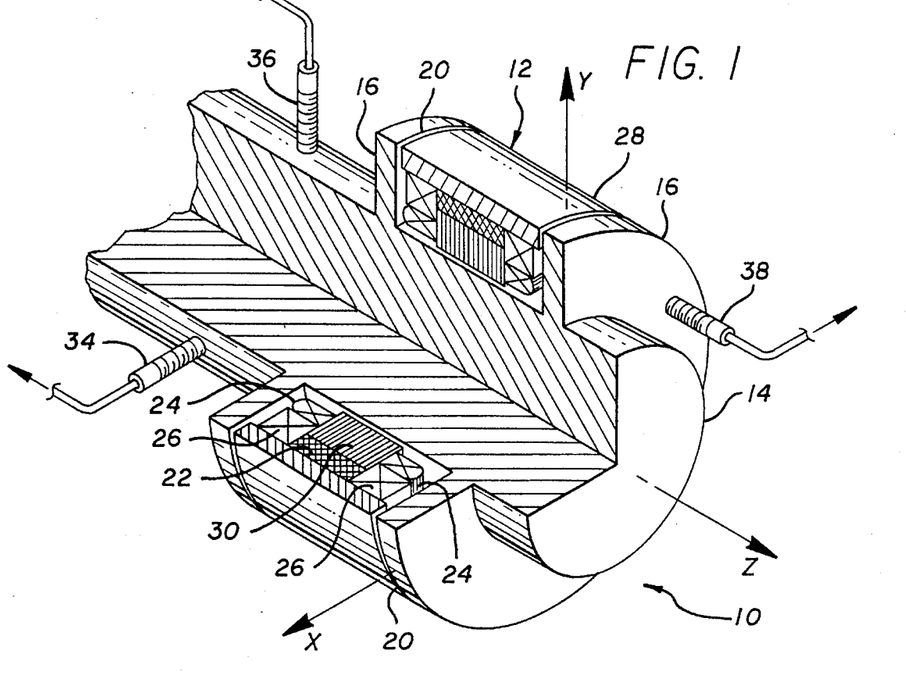
FIG. 1 is a fragmented partially sectional perspective view of a magnetic bearing embodying the invention, illustrating the use of a single electromagnetic bearing structure adjacent to an end of a rotatable shaft, which provides radial and axial load support to the shaft.

In accordance with the present invention, and as illustrated with respect to a first preferred embodiment in FIGS. 1–3, the magnetic bearing 10 comprises an elongated axial stator pole 28 which comprises a portion of the housing 12 and extends circumferentially about the shaft 14. A radially polarized permanent magnet 22 is positioned inwardly adjacent to the axial stator pole 28 and also extends circumferentially about the shaft 14. An arcuate ring 30, preferably formed of laminated stacked plates and having high magnetic flux permeability, is further positioned radially inwardly and adjacent to the permanent magnet 22. The space between an inwardly facing surface of the arcuate ring 30 and an outwardly facing surface of the shaft 14 defines the radial air gap 18. The arcuate ring 30 is provided with a plurality of circumferentially spaced apart individual slots 32 for receiving active control electromagnet coils 24. Two additional electromagnet coils 26 are situated adjacent to and extend coextensively circumferentially about the shaft 14 with the stator pole 28 and the arcuate ring 30, between the axial stator pole 28 and the circumferentially spaced apart active control electromagnet coils 24.

The shaft includes two thrust discs 16 which are axially spaced from one another so as to position the arcuate ring 30, the permanent magnet 22, the electromagnet coils 24 and 26, and the axial stator pole 28 therebetween. The spacing between the facing on opposite sides of a thrust disc, and by an axially polarized controllable electromagnet coil which circumscribes the shaft.

DETAILED DESCRIPTION OF THE PREFERRED EMBODIMENTS

As shown in the drawings for purposes of illustration, the present invention is concerned with an improved magnetic bearing, generally designated in the accompanying drawings by the reference number 10. The magnetic bearing 10 comprises a stationary outer housing 12 and a cylindrical rotatable shaft 14 which extends axially through the housing. The shaft is provided with one or more thrust discs 16 which extend radially outwardly about the periphery of the shaft. Each of the magnetic bearings 10 has one or more radial air gaps 18 between the housing 12 and the shaft 14 (FIGS. 1–3, 6 and 7), or between the housing 12 and the thrust disc 16 (FIGS. 4 and 5), and a pair of axial air gaps 20 between the housing 12 and the thrust disc(s) 16.

One or more permanent magnets 22 are associated with the housing 12 and circumscribe a portion of the shaft 14. The permanent magnet(s) 22 generates a high density magnetic field surrounding the shaft 14, and the magnetic flux generated is directed across both the radial and axial air gaps 18 and 20. Each illustrated magnetic bearing 10 includes a plurality of electromagnet coils 24 for generating a radially polarized controllable electromagnetic field which magnetically links the housing 12 and the shaft 14 or the thrust disc 16, through the radial air gap(s) 18. Further, each magnetic bearing 10 includes one or more separate electromagnet coils 26 which extend circumferentially around the shaft and generate an axially polarized controllable electromagnetic field for linking the housing to the thrust disc(s) 16 through the axial air gaps 20. The electromagnet coils diametrically opposite side thereof where another electromagnet coil 24 having an opposite polarity is located. The flux path 44 is there directed across the radial air gap 18 and is conducted circumferentially about the shaft 14 through the arcuate ring 30.

The reference number 42 identifies an exemplary magnetic flux path of the active control electromagnet coils 26 (FIG. 2). Each of the electromagnet coils 26 is capable of generating an axially polarized, controllable electromagnetic field, wherein the flux path 42 is directed axially through the stator pole 28 across a first one of the axial air gaps 20, whereat it is redirected radially toward the shaft and then axially toward a second one of the thrust discs 16 and then across a second one of the axial air gaps 20 back to the stator pole 28.

In use, the magnetic field generated by the permanent magnet 22 tends to cause the shaft 14 to displace from a true centered position and into engagement with the arcuate ring 30. Such displacement is sensed by the X-axis and Y-axis position sensors 34 and 36 which provide input to a servo circuit. An exemplary servo circuit is described in U.S. Pat. No. 5,111,102. The servo circuit selectively controls electrical current to the active control electromagnet coils 24 positioned by the arcuate ring 30, in order to provide a positive gradient which keeps the shaft 14 in a true radially-centered position. The greater the displacement of the shaft 14, the greater the restoring force generated through the use of the servo circuit and the electromagnet coils 24. Thus, a high density magnetic field is produced through the radial air gaps 18, which produces a radial force system which is metastable when the shaft is centered within the housing 12.

Similarly, the magnetic field generated by the permanent magnet 22 also tends to cause the shaft 14 to displace from a true axially centered position and cause the thrust discs 16 to move into engagement with axial stator pole 28. Such displacement is sensed by the Z-axis position sensor 38 which provides input to the servo circuit. The servo circuit selectively controls electrical current to the active control electromagnet coils 26 in order to provide a positive gradient which keeps the thrust discs 16 properly spaced from the axial stator pole 28, thus centering the shaft 14. The greater the displacement of the shaft 14, the greater the restoring force generated through the use of the servo circuit and the electromagnet coils 26. Thus, a high density magnetic field is produced through the axial air gaps 20, which produces an axial force system which is metastable when the thrust discs 16 are equidistantly spaced from opposite ends of the axial stator pole 28.

The permanent magnet 22 provides a high density magnetic field through both the radial air gap 18 and the axial air gaps 20, which is necessary to support the shaft 14 in a levitated or suspended position within the housing 12. The active control electromagnet coils 24 and 26 provide for stabilization of the shaft 14. This arrangement results in a much more efficient bearing structure than previous types of electromagnetic bearings.

Figure 5:
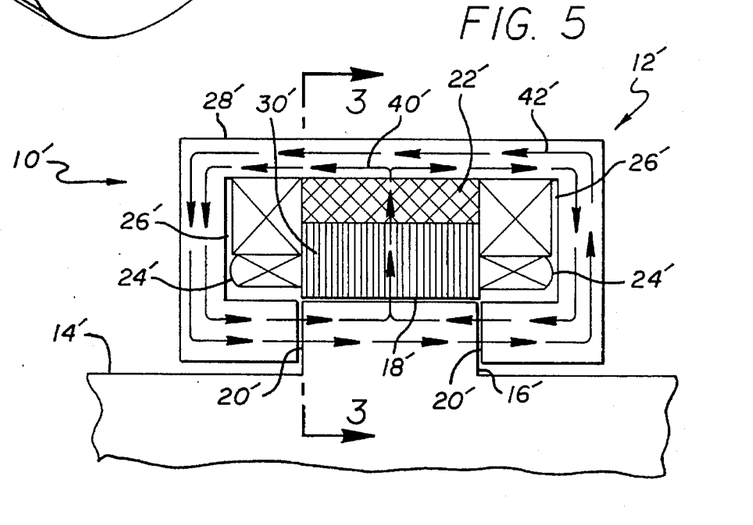
FIG. 5 is an enlarged fragmented sectional elevational view of the magnetic bearing illustrated in FIG. 4, showing exemplary magnetic flux paths generated by a radially polarized permanent magnet and a pair of axially polarized controllable electromagnet coils.

In a second embodiment of the present invention illustrated in FIGS. 4 and 5, the construction and operation of the magnetic bearing 10' is quite similar to that described above in connection with the first embodiment illustrated in FIGS. 1–3, with the exception that a single thrust disc 16' is utilized which requires a modification in the shape of the axial stator pole 28'. In the discussion of the second embodiment magnetic bearing 10', functionally equivalent elements retain the same numbering as set forth in connection with the first embodiment (FIGS. 1–3), differentiated by the prime (') symbol.

As was the case with the magnetic bearing 10, the magnetic bearing 10' supports loads in both the radial and axial directions. The stationary permanent magnet 22' is utilized to energize both the radial and axial air gaps 18' and 20' to establish a high density magnetic flux across those air gaps. The magnetic fields produced by the permanent magnet 22' create a radial force system and an axial force system that are metastable when the shaft 14' and the thrust disc 16' are radially and axially centered.

To actively control and stabilize the shaft 14' relative to the stationary housing 12', electromagnet coils 24' and 26' are utilized. The coils act to cancel the metastable "negative spring" effect of the permanent magnet and stabilize the shaft 14' in an optimal, centered position both radially and axially. For maximum isolation and ease of control, different electromagnet coils are used to control the bearing in different axis (X, Y and Z). As indicated in FIG. 5, the electromagnet coils 24' generate a radially polarized electromagnetic field for radial control of the shaft 14' relative to the stationary housing 12'. These electromagnet coils 24' establish a magnetic flux 44' having a flux path as illustrated generally in FIG. 3. The two electromagnet coils 26' are utilized for active control in the axial direction. These coils 26' produce the magnetic flux 42' that cancels the magnetic flux 40' generated by the permanent magnet 22' on one side of the thrust disc 16', and aids the permanent magnet flux 40' on the other side of the thrust disc 16'. The result is an active control system in the axial direction.

Figure 6:
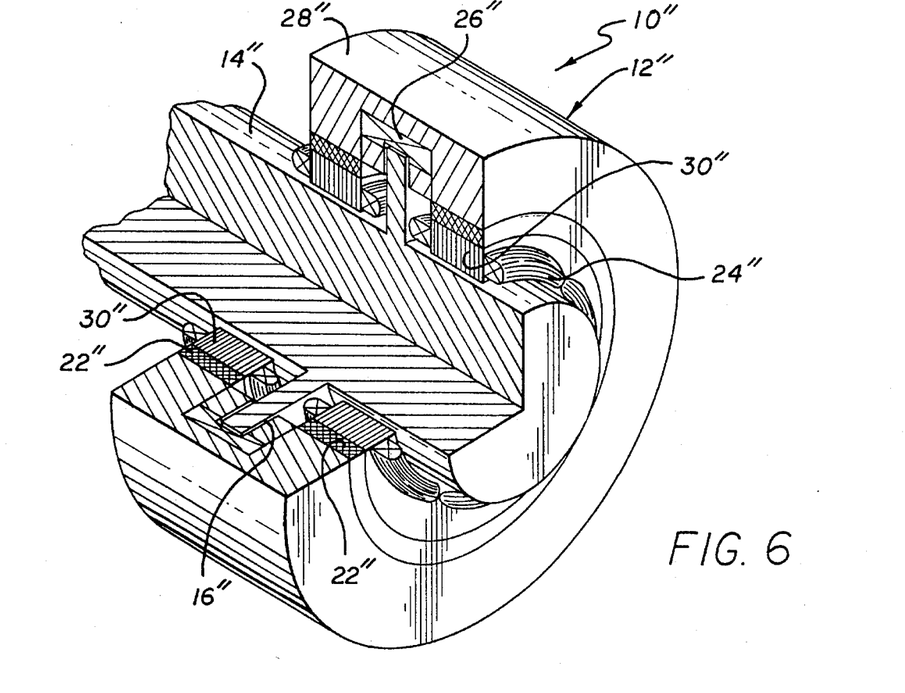
FIG. 6 is a fragmented partially sectional perspective view similar to that shown in FIGS. 1 and 4, illustrating a third magnetic bearing embodying the invention.
Figure 7:
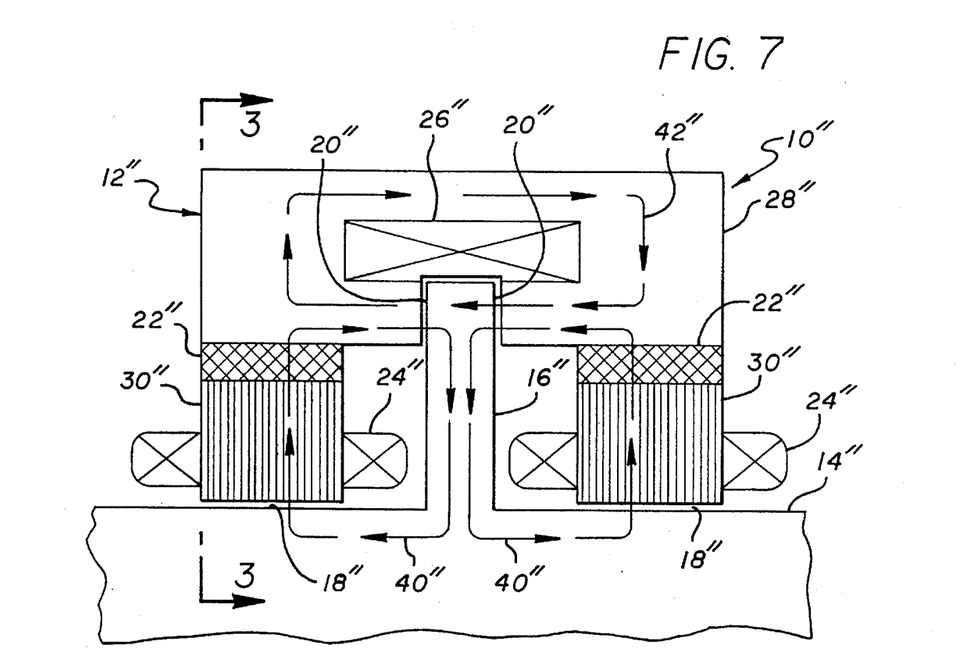
FIG. 7 is an enlarged fragmented sectional elevational view of the magnetic bearing illustrated in FIG. 6, showing exemplary flux paths generated by a pair of radially polarized permanent magnets situated toward the arcuate ring 30.

FIGS. 6 and 7 illustrate yet another magnetic bearing 10", wherein functionally equivalent elements retain the same numbering set forth in connection with the first and second embodiments, but further designated by a double prime (") symbol. The magnetic bearing 10" supports load in both the radial and axial directions in a manner similar to that illustrated in connection with the bearing 10 of FIGS. 1–3 and 10' of FIGS. 4 and 5.

The magnetic bearing 10" includes a shaft 14" having a single thrust disc 16", and a pair of arcuate rings 30" associated with the stationary housing 12", which are located on opposite sides of the thrust disc 16". A permanent magnet 22" is associated with each of the arcuate rings 30". The permanent magnets 22" are utilized to energize both the radial air gaps 18" and the axial air gaps 20" to establish a high density magnetic flux 40" across these working air gaps. These magnetic fields produce a radial force system and an axial force system that are metastable when the shaft 14" and the thrust disc 16" are radially and axially centered.

To actively control and stabilize the magnetic bearing 10", the electromagnet coils 24" and 26" are utilized in the same manner as set forth above. These coils act to counter the "negative spring" effect of the permanent magnets 22" and stabilize the shaft 14" in the optimal, centered position both radially and axially. For maximum isolation and ease of control, different electromagnet coils are used to control positioning of the thrust disc 16" and shaft 14" in different axes (X, Y and Z).

In contrast with the magnetic bearings 10 and 10' of FIGS. 1–5, the magnetic bearing 10" utilizes a single electromagnet coil 26" for active control of the positioning of the thrust disc 16" in the axial direction. The electromagnet coil 26" produces magnetic flux 42" having a flux path that extends axially across the axial air gaps 20". The electromagnet coils 24" on each of the two arcuate rings 30' provide radial control over the positioning of the shaft 14" relative to the stationary housing 12". These electromagnet coils 24" establish magnetic flux 44" across the radial air gaps 18" to establish X and Y-axis control. The flux paths 44" for the magnetic flux generated by the electromagnet coils 24" are again illustrated generally in FIG. 3.

From the foregoing it is to be appreciated that the improved magnetic bearings 10, 10' and 10" of the present invention combine radial and axial bearings into a single magnetic bearing system. This results in significant savings in bearing system size, weight, complexity and cost, in comparison with similar systems which utilize separate radial and axial bearings. The utilization of non-rotating, high strength permanent magnets to provide bearing bias magnetic fields reduces required power and size, and increases bearing reliability. The bearing control electronics also benefit from the use of permanent magnets since reduced bearing power requirements allow for reduced electronics size and complexity.

Although three particular embodiments of the invention have been described in detail for purposes of illustration, various modifications of each may be made without departing from the spirit and scope of the invention. Accordingly, the invention is not to be limited, except as by the appended claims.

We claim:

1. A magnetic bearing for supporting a rotatable member including a thrust disc with respect to a stationary member, the magnetic bearing comprising:

first means associated with the stationary member for generating a magnetic field, the first magnetic field generating means including first means for generating a radially polarized magnetic field and being linked magnetically to the rotatable member through a first air gap between the rotatable member and the stationary member to provide radial magnetic flux coupling of the rotatable member to the stationary member, wherein the first radially polarized magnetic field generating means includes a first arcuate ring of high magnetic flux permeability and a plurality of controllable electromagnet coils circumferentially positioned about the first arcuate ring and radially spaced from the rotatable member, and a second arcuate ring of high magnetic flux permeability and a plurality of electromagnet coils circumferentially positioned about the second arcuate ring and radially spaced from the rotatable member;

second means associated with the stationary member for generating a magnetic field, the second magnetic field generating means including second means for generating a radially polarized magnetic field and being linked magnetically to the rotatable member through the first air gap and a second air gap between the thrust disc and the stationary member, to provide both radial and axial magnetic flux coupling of the rotatable member to the stationary member; and third means associated with the stationary member for generating a magnetic field, the third magnetic field generating means including means for generating an axially polarized magnetic field and being linked magnetically to the rotatable member through the second air gap to provide axial magnetic flux coupling of the rotatable member to the stationary member.

2. A magnetic bearing as set forth in claim 1, wherein the second radially polarized magnetic field generating means comprises a permanent magnet.

3. A magnetic bearing as set forth in claim 1, wherein the second radially polarized magnetic field generating means includes a permanent magnet circumscribing the rotatable member and spaced radially outwardly from the plurality of electromagnetic coils.

4. A magnetic bearing as set forth in claim 3, wherein the axially polarized magnetic field generating means includes an electromagnetic coil associated with the arcuate ring which circumscribes a portion of the rotatable member.

5. A magnetic bearing as set forth in claim 3, wherein the axially polarized magnetic field generating means includes a pair of electromagnetic coils associated with the arcuate ring and situated on opposite sides thereof, said electromagnetic coils circumscribing a portion of the rotatable member and being spaced radially outwardly from the electromagnetic coils of the first radially polarized magnetic field generating means.

6. A magnetic bearing as set forth in claim 1, wherein the stationary member includes an axial stator pole having two faces situated in opposite facing relation to two thrust disc faces, to define a pair of second air gaps.

7. A magnetic bearing as set forth in claim 6, including a pair of thrust discs axially spaced from one another, and wherein the first and second radially polarized magnetic field generating means and the axially polarized magnetic field generating means are situated between the pair of thrust discs.

8. A magnetic bearing as set forth in claim 6, wherein the first air gap is defined by a radially outwardly facing surface of the thrust disc.

9. A magnetic bearing as set forth in claim 1, wherein the second radially polarized magnetic field generating means includes a radially polarized permanent magnet circumscribing a portion of the rotatable member and spaced radially outwardly from each of the arcuate rings.

10. A magnetic bearing as set forth in claim 9, wherein the axially polarized magnetic field generating means includes an electromagnetic coil associated with the arcuate rings and which circumscribes a portion of the rotatable member.

11. A magnetic bearing for supporting a rotatable member including a thrust disc with respect to a stationary member, the magnetic bearing comprising:

means associated with the stationary member for generating a radially polarized controllable electromagnetic field surrounding a portion of the rotatable member, the radially polarized electromagnetic field generating means being linked magnetically to the rotatable member through a radial air gap between the rotatable member and the stationary member and including an arcuate ring of high magnetic flux permeability, and a plurality of controllable electromagnet coils circumferentially positioned about the arcuate ring and radially paced from the rotatable member;

means associated with the stationary member for generating a radially polarized, constant flux magnetic field, the radially polarized, constant flux magnetic field generating means being linked magnetically to the rotatable member through both the radial air gap and an axial air gap between the thrust disc and the stationary member and including a permanent magnet circumscribing the rotatable member and spaced radially outwardly from the plurality of electromagnet coils of the radially polarized electromagnetic field generating means; and means associated with the stationary member for generating an axially polarized controllable electromagnetic field, the axially polarized electromagnetic field generating means being linked magnetically to the thrust disc through the axial air gap and including a pair of electromagnet coils associated with the arcuate ring and situated on opposite sides thereof, said electromagnet coils circumscribing a portion of the rotatable member and being spaced radially outwardly from the electromagnet coils of the first radially polarized magnetic field generating means.

12. A magnetic bearing as set forth in claim 11, including a pair of thrust discs axially spaced from one another such that the radially polarized electromagnetic field generating means, the radially polarized, constant flux magnetic field generating means and the axially polarized electromagnetic field generating means, are situated between the pair of thrust discs, and wherein the stationary member includes an axial stator pole having two faces situated in opposite facing relation to two thrust disc faces, to define a pair of axial air gaps.

13. A magnetic bearing as set forth in claim 11, wherein the radial air gap is defined by a radially outwardly facing surface of the thrust disc.

14. A magnetic bearing for supporting a rotatable member including a thrust disc with respect to a stationary member, the magnetic bearing comprising:

means associated with the stationary member for generating a radially polarized controllable electromagnetic field surrounding a portion of the rotatable member, the radially polarized electromagnetic field generating means including an arcuate ring of high magnetic flux permeability, and a plurality of electromagnet coils circumferentially positioned about the arcuate ring and radially spaced from the rotatable member;

a permanent magnet spaced radially outwardly from the plurality of electromagnet coils and circumscribing a portion of the rotatable member, wherein the permanent magnet is linked magnetically to the rotatable member through both a first air gap between the rotatable member and the stationary member, and a second air gap between the stationary member and the thrust disc; and means associated with the stationary member for generating an axially polarized electromagnetic field, the axially polarized electromagnet field generating means including a pair of electromagnet coils associated with the arcuate ring and situated on opposite sides thereof, said electromagnet coils circumscribing a portion of the rotatable member and being spaced radially outwardly from the electromagnet coils of the radially polarized electromagnetic field generating means.

15. A magnetic bearing as set forth in claim 14, including a pair of thrust discs axially spaced from one another such that the radially polarized electromagnetic field generating means, the permanent magnet and the axially polarized electromagnetic field generating means are situated between the pair of thrust discs, and wherein the stationary member includes an axial stator pole having two faces situated in opposite facing relating to two thrust disc faces, to define two second air gaps.

16. A magnetic bearing as set forth in claim 14, wherein the first air gap is defined by a radially outwardly facing surface of the thrust disc.

17. A magnetic bearing as set forth in claim 14, wherein the radially polarized electromagnetic field generating means includes spaced first and second arcuate rings of high magnetic flux permeability, and a plurality of electromagnet coils circumferentially positioned about each of the first and second arcuate rings and radially spaced from the rotatable member, and wherein the permanent magnet is spaced radially outwardly from each of the arcuate rings and circumscribes a portion of the rotatable member.

18. A magnetic bearing as set forth in claim 14, wherein the radially polarized electromagnetic field generating means is linked magnetically to the rotatable member through the first air gap, and the axially polarized electromagnetic field generating means is linked magnetically to the rotatable member through the second air gap.

19. A magnetic bearing for supporting a rotatable member including a thrust disc with respect to a stationary member, the magnetic bearing comprising:

means associated with the stationary member for generating a radially polarized controllable electromagnetic field surrounding a portion of the rotatable member, the radially polarized electromagnetic field generating means being linked magnetically to the rotatable member through a radial air gap between the rotatable member and the stationary member and including spaced first and second arcuate rings of high magnetic flux permeability, and a plurality of electromagnet coils circumferentially positioned about each of the first and second arcuate rings and radially spaced from the rotatable member;

means associated with the stationary member for generating a radially polarized, constant flux magnetic field, the radially polarized, constant flux magnetic field generating means being linked magnetically to the rotatable member through both the radial air gap and an axial air gap between the thrust disc and the stationary member and including a radially polarized permanent magnet spaced radially outwardly from each of the arcuate rings and circumscribing a portion of the rotatable member; and means associated with the stationary member for generating an axially polarized controllable electromagnetic field, the axially polarized electromagnetic field generating means being linked magnetically to the thrust disc through the axial air gap.

20. A magnetic bearing as set forth in claim 19, wherein the axially polarized electromagnetic field generating means includes an electromagnet coil associated with the first and second arcuate rings, and which circumscribes a portion of the rotatable member.

21. A magnetic bearing for supporting a rotatable member including a thrust disc with respect to a stationary member, the magnetic bearing comprising:

means associated with the stationary member for generating a radially polarized controllable electromagnetic field surrounding a portion of the rotatable member, the radially polarized electromagnetic field generating means including spaced first and second arcuate rings of high magnetic flux permeability, and a plurality of electromagnet coils circumferentially positioned about each of the first and second arcuate rings and radially spaced from the rotatable member;

a permanent magnet spaced radially outwardly from each of the arcuate rings and circumscribing a portion of the rotatable member, wherein the permanent magnet is linked magnetically to the rotatable member through both a first air gap between the rotatable member and the stationary member, and a second air gap between the stationary member and the thrust disc; and means associated with the stationary member for generating an axially polarized electromagnetic field, the axially polarized electromagnet field generating means including an electromagnetic coil associated with the arcuate ring and circumscribing a portion of the rotatable member.

22. A magnetic bearing as set forth in claim 21, wherein the axially polarized electromagnetic field generating means includes an electromagnet coil associated with the first and second arcuate rings, and which circumscribes a portion of the rotatable member.

* * * * *